(12) United States Patent
Yamakawa et al.

(10) Patent No.: US 8,580,366 B2
(45) Date of Patent: Nov. 12, 2013

(54) HOSE FOR REFRIGERANT TRANSPORT USE

(75) Inventors: Kazuto Yamakawa, Hiratsuka (JP); Yuusuke Matsuya, Hiratsuka (JP); Koji Sato, Hiratsuka (JP); Susumu Hatanaka, Hiratsuka (JP); Hideyuki Oishi, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 45 days.

(21) Appl. No.: 13/369,771

(22) Filed: Feb. 9, 2012

(65) Prior Publication Data
US 2013/0025733 A1 Jan. 31, 2013

(51) Int. Cl.
*B29C 47/00* (2006.01)

(52) U.S. Cl.
USPC ........ 428/36.9; 428/36.91; 138/137; 138/140

(58) Field of Classification Search
USPC ....................... 428/36.9, 36.91; 138/137, 140
See application file for complete search history.

(56) References Cited

U.S. PATENT DOCUMENTS

| | | | |
|---|---|---|---|
| 5,362,530 A | 11/1994 | Kitami et al. | |
| 5,488,974 A * | 2/1996 | Shiota et al. | 138/125 |
| 2003/0034081 A1* | 2/2003 | Daikai et al. | 138/126 |
| 2009/0314015 A1* | 12/2009 | Minor et al. | 62/115 |
| 2010/0038583 A1 | 2/2010 | Shimomura et al. | |
| 2010/0051854 A1 | 3/2010 | Sawada et al. | |
| 2012/0021157 A1* | 1/2012 | Kawai et al. | 428/36.91 |
| 2013/0025733 A1* | 1/2013 | Yamakawa et al. | 138/137 |
| 2013/0056106 A1* | 3/2013 | Yamakawa et al. | 138/137 |
| 2013/0068338 A1* | 3/2013 | Shinoda et al. | 138/141 |

FOREIGN PATENT DOCUMENTS

| | | |
|---|---|---|
| DE | 4132123 | 4/1992 |
| EP | 2413010 | 2/2012 |
| JP | 7117178 | 5/1995 |
| JP | 08-104807 | 4/1996 |
| JP | 2007-090563 | 4/2007 |
| JP | 2007090563 | 4/2007 |
| WO | WO 2008-027555 | 3/2008 |

OTHER PUBLICATIONS

PCT search report; PCT/JP2010/052752; filing date Feb. 23, 2010; report dated Mar. 22, 2012; The Yokohama Rubber Co., LTD.
Extended European Search Report, Feb. 1, 2013, 6 pages, Germany.

* cited by examiner

*Primary Examiner* — N. Edwards
(74) *Attorney, Agent, or Firm* — Thorpe North & Western LLP

(57) ABSTRACT

A hose for refrigerant transport use comprising an inner layer with superior deterioration resistance performance. The innermost layer comprised in the hose for refrigerant transport use of the present invention is formed using a polyamide resin composition comprising a polyamide and, per 100 parts by mass thereof, from 0.5 to 20 parts by mass of an acid acceptor.

16 Claims, 3 Drawing Sheets

|  | C.E. | W.E. | | | | | C.E. |
| --- | --- | --- | --- | --- | --- | --- | --- |
|  | 1 | 1 | 2 | 3 | 4 | 5 | 2 |
| Polyamide (1) | 100 | 100 |  | 100 |  | 100 | 100 |
| Polyamide (2) |  |  |  |  |  |  |  |
| Acid acceptor 1 |  | 7 | 10 |  |  |  |  |
| Acid acceptor 2 |  |  |  |  |  | 3 |  |
| Acid acceptor 3 |  |  |  | 5 | 15 |  | 0.3 |
| Acid acceptor 4 |  |  |  |  |  |  |  |
| Acid sealing agent 1 |  |  |  |  |  | 3 |  |
| Pre-immersion | EB (%) | 270 | 250 | 220 | 270 | 200 | 275 | 270 |
|  | TB (MPa) | 31 | 30 | 28 | 35 | 23 | 33 | 31 |
|  | Condition after bending | No cracking | No cracking | No cracking | No cracking | No cracking | No cracking | No cracking |
| Post-immersion | EB (%) | Un-measureable | 38 | 53 | 87 | 130 | 90 | 52 |
|  | TB (MPa) | Un-measureable | 18 | 20 | 22 | 29 | 25 | 19 |
|  | Young's modulus (MPa) (300 MPa or less) | Un-measureable | 270 | 270 | 265 | 250 | 260 | 240 |
|  | Condition after bending | Brittle, cracks immediately | No cracking | No cracking | No cracking | No cracking | No cracking | Cracks |

FIG. 2a

|  |  | W.E. |  |  |  |  | C.E. |
| --- | --- | --- | --- | --- | --- | --- | --- |
|  | 6 | 7 | 8 | 9 | 10 | 11 | 3 |
| Polyamide (-) | 100 | 100 | 100 | 100 | 100 |  | 100 |
| Polyamide (2) |  |  |  |  |  | 100 |  |
| Acid acceptor 1 |  |  |  |  |  |  |  |
| Acid acceptor 2 |  |  |  |  |  |  |  |
| Acid acceptor 3 | 0.5 | 5 | 10 | 20 |  | 10 | 23 |
| Acid acceptor 4 |  |  |  |  | 10 |  |  |
| Acid sealing agent 1 |  |  |  |  |  |  |  |
| Pre-immersion EB (%) | 270 | 265 | 245 | 185 | 250 | 350 | 150 |
| Pre-immersion TB (MPa) | 31 | 31 | 30 | 27 | 30 | 34 | 22 |
| Pre-immersion Condition after bending | No cracking | No cracking | No cracking | No cracking | No cracking | No cracking | No cracking |
| Post-immersion EB (%) | 150 | -65 | 200 | 180 | 155 | 230 | 130 |
| Post-immersion TB (MPa) | 22 | 23 | 26 | 25 | 22 | 23 | 19 |
| Post-immersion Young's modulus (MPa) (300 MPa or less) | 240 | 260 | 285 | 300 | 270 | 210 | 320 |
| Post-immersion Condition after bending | No cracking | No cracking | No cracking | No cracking | No cracking | No cracking | No cracking |

FIG. 2b

HOSE FOR REFRIGERANT TRANSPORT USE

TECHNICAL FIELD

The present invention relates to a hose for refrigerant transport use.

BACKGROUND ART

Currently, since HFC134a, which is used as a refrigerant in car air conditioning systems, has a large global warming potential (GWP), HFO1234yf, which has a small GWP, has emerged as a promising new refrigerant candidate to replace HFC134a. For example, Japanese Unexamined Patent Application Publication No. 2009-074017A proposes a composition comprising a refrigerant such as HFO1234yf and a lubricating oil.

Additionally, conventionally, laminated structures of a rubber and a resin comprising an innermost layer formed from a polyamide resin material in order to suppress the permeation of a refrigerant have been commonly used for rubber hoses for use in car air conditioning systems.

SUMMARY OF THE INVENTION

However, the inventors discovered that when a refrigerant composition comprising a fluorine-based compound having a double bond such as HFO-1234yf as a refrigerant and a lubricating oil was applied to a conventional rubber hose for use in car air conditioning systems, deterioration resistance performance (durability) of the innermost layer of the hose with respect to the new refrigerant is low.

Therefore, an object of the present invention is to provide a hose for refrigerant transport use comprising an innermost layer that displays superior deterioration resistance performance.

As a result of diligent research into a solution for the problem describe above, the inventors discovered that an innermost layer formed using a polyamide resin composition comprising a polyamide and an acid acceptor has superior deterioration resistance performance, and thus arrived at the present invention.

Specifically, the present invention provides the following 1 to 12.

1. A hose for refrigerant transport use comprising an innermost layer formed using a polyamide resin composition comprising a polyamide and, per 100 parts by mass thereof, from 0.5 to 20 parts by mass of an acid acceptor.
2. The hose for refrigerant transport use described in 1, wherein the acid acceptor is at least one selected from the group consisting of hydrotalcite, magnesium oxide, and calcium hydroxide.
3. The hose for refrigerant transport use described in 1 or 2, wherein the polyamide resin composition further comprises a carboxyl group-containing modified polyolefin.
4. The hose for refrigerant transport use described in any one of 1 to 3, wherein the polyamide is at least one selected from the group consisting of polyamide 6, polyamide 11, polyamide 12, polyamide 4-6, polyamide 6-6, polyamide 6-10, polyamide 6-12, and polyamide MXD6.
5. The hose for refrigerant transport use described in 3 or 4, wherein a weight ratio (mass ratio) of the polyamide to the carboxyl group-containing modified polyolefin is from 90/10 to 50/50.
6. The hose for refrigerant transport use described in any one of 1 to 5 used for a refrigerant-containing composition comprising a fluorine-based compound having double bonds as a refrigerant.
7. The hose for refrigerant transport use described in 6, wherein the fluorine-based compound is at least one fluoropropene selected from the group consisting of 1,2,3,3,3-pentafluoropropene, 1,3,3,3-tetrafluoropropene, 2,3,3,3-tetrafluoropropene, 1,2,3,3-tetrafluoropropene, and 3,3,3-trifluoropropene.
8. The hose for refrigerant transport use described in any one of 1 to 7, wherein the polyamide resin composition further comprises an acid sealing agent.
9. The hose for refrigerant transport use described in 8, wherein the acid sealing agent is at least one selected from the group consisting of a carbodiimide compound, an epoxy compound, an amine compound, an isocyanate compound, and an alcohol.
10. The hose for refrigerant transport use described in 9, wherein an epoxy equivalent weight of the epoxy compound is from 140 to 3,300 g/eq.
11. The hose for refrigerant transport use described in any one of 8 to 10, wherein an amount of the acid sealing agent is from 0.1 to 10 parts by mass per 100 parts by mass of the polyamide.
12. The hose for refrigerant transport use described in any one of 1 to 11 comprising a rubber layer on the innermost layer, a reinforcing layer on the rubber layer, and an outer layer on the reinforcing layer.

Effect of the Invention

The hose for refrigerant transport use of the present invention comprises an innermost layer that displays superior deterioration resistance performance.

BRIEF DESCRIPTION OF THE DRAWING

FIGS. 2*a*-2*b* include a Table of comparative and working examples in accordance with examples of the present technology.

DETAILED DESCRIPTION

Figure 1:
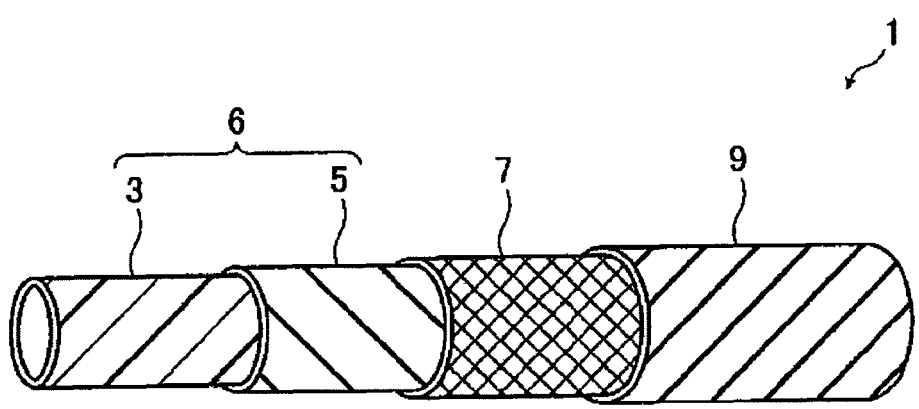
FIG. 1 is a perspective view schematically illustrating a cutaway of each layer of a hose that is an example of the hose for refrigerant transport use of the present invention.

The present invention is described in detail below.

A hose for refrigerant transport use of the present invention comprises an innermost layer formed using a polyamide resin composition comprising a polyamide and, per 100 parts by mass thereof, from 0.5 to 20 parts by mass of an acid acceptor.

The hose for refrigerant transport use of the present invention comprises an innermost layer that displays superior deterioration resistance performance.

In the present invention, "deterioration resistance performance of the innermost layer" refers to the suppression of chemically induced deterioration of the resin due to attacks by new refrigerants, chemicals, or the like.

Conventionally, a refrigerant-containing composition comprising a refrigerant and a lubricating oil had been applied to a hose for refrigerant transport use, and this refrigerant-containing composition is passed through the hose for refrigerant transport use. When using the hose for refrigerant transport use for an extended period of time, in some cases, while a small amount, water permeates through the hose for refrigerant transport use and contaminates the refrigerant-containing composition. Such contamination by water invites deterioration of the refrigerant-containing composition when used under high-temperature conditions. Acidic components (e.g. components thought to be hydrogen fluoride) are produced from the refrigerant-containing composition, and it is thought that these acidic components act as catalysts that hydrolyze the polyamide used in the innermost layer of the hose for refrigerant transport use. This hydrolysis of the polyamide leads to a decline in the deterioration resistance performance of the innermost layer.

In the present invention, an acid acceptor can trap the acidic components. It is possible for the acid acceptor to trap the acidic components by reacting with the acidic components.

The hydrolysis of the polyamide can be suppressed by the trapping of the acidic components by the acid acceptor. The present inventors have deduced that superior deterioration resistance performance of the innermost layer will be obtained due to the suppressing the hydrolysis of the polyamide in such a manner.

Additionally, the acid acceptor can trap carboxylic acids that are present in the innermost layer and/or acids produced via the hydrolysis of lubricants such as ester-based oil that are included in the refrigerant-containing composition. It is possible for the acid acceptor to trap the acid by reacting with the acid.

The acid is not particularly limited as long as it is a compound having at least one acidic group (e.g. carboxy group). Examples thereof include acids such as carboxylic acid, phosphoric acid, and sulfonic acid; and partial esters of acids. Examples of the partial esters include partial esters that have at least one acidic group and at least one ester.

Specific examples of the acid include carboxylic acid present in the innermost layer and acids that are produced via the hydrolysis of lubricants such as ester-based oil included in the refrigerant-containing composition applied to the hose for refrigerant transport use. Examples of the carboxylic acid present in the innermost layer include carboxylic acids that attach to an end of a polyamide, and carboxylic acids that are produced via a polyamide hydrolyzing as a result of being affected by the deterioration or the like of the refrigerant-containing composition.

The acid acceptor can suppress the hydrolysis of the polyamide by reacting with the carboxylic acid that attaches to an end of a polyamide, the acid that is produced via a polyamide hydrolyzing as a result of being affected by the deterioration or the like of the refrigerant-containing composition, or an acid produced from the refrigerant-containing composition. The present inventors have deduced that an innermost layer having superior deterioration resistance performance will be obtained by suppressing the hydrolysis of the polyamide in such a manner.

Note that the mechanism described above is a deduction of the present inventors, and, even in cases involving different mechanisms, such mechanisms are within the scope of the present invention.

An example of a preferred embodiment of the hose for refrigerant transport use of the present invention is described below while referencing the attached drawing. However, the present invention is not limited to the attached drawing.

FIG. 1 is a perspective view schematically illustrating a cutaway of each layer of a hose that is an example of the hose for refrigerant transport use of the present invention.

A hose for refrigerant transport use 1 illustrated in FIG. 1 comprises an inner tube 6, a reinforcing layer 7, and an outer layer 9. The inner tube 6 has an innermost layer 3 and a rubber layer 5. The rubber layer 5 is on the innermost layer 3 (inner surface resin layer), the reinforcing layer 7 is on the rubber layer 5, and the outer layer 9 is on the reinforcing layer 7.

The hose for refrigerant transport use comprising an inner tube, a reinforcing layer, and an outer layer, with the inner tube comprising an innermost layer (inner surface resin layer) and a rubber layer is an example of a preferred form of the hose for refrigerant transport use of the present invention.

From the perspectives of obtaining an innermost layer that is superior with regards to deterioration resistance performance and achieves superior flexibility (flexibility of the innermost layer and the entire hose), a thickness of the innermost layer is preferably from 0.05 to 0.3 mm.

From the perspectives of achieving superior fatigue resistance performance and superior flexibility (flexibility of the rubber layer and the entire hose), a thickness of the rubber layer is preferably from 1.0 to 2.0 mm.

From the perspectives of achieving superior fatigue resistance performance and superior flexibility (flexibility of the reinforcing layer and the entire hose), a thickness of the reinforcing layer is preferably from 0.5 to 1.5 mm.

From the perspectives of achieving superior fatigue resistance performance and superior flexibility (flexibility of the outer layer and the entire hose), a thickness of the outer layer is preferably from 0.5 to 1.5 mm.

A description of the innermost layer is given below.

The innermost layer comprised in the hose for refrigerant transport use of the present invention is formed using a polyamide resin composition comprising a polyamide and, per 100 parts by mass thereof, from 0.5 to 20 parts by mass of an acid acceptor.

The acid acceptor is not particularly limited. Examples of the acid acceptor include metal compounds, inorganic microporous crystals, and hydrotalcites.

Examples of the metal compounds include oxides, hydroxides, carbonates, carboxylates, silicates, borates, and phosphites of periodic table group II (group 2 and group 12 elements) metals; oxides, hydroxides, carboxylates, silicates, sulfates, nitrates, and phosphates of periodic table group III (group 3 and group 13 elements) metals; and oxides, basic carbonates, basic carboxylates, basic phosphites, basic sulfites, tribasic sulfates of periodic table group IV (group 4 and group 14 elements) metals, and the like.

Specific examples of the metal compounds include magnesium oxide (MgO, magnesia), calcium hydroxide, magnesium hydroxide, aluminum hydroxide, barium hydroxide, sodium carbonate, magnesium carbonate, barium carbonate, calcium oxide, calcium carbonate, calcium silicate, calcium stearate, zinc stearate, zinc oxide, calcium phthalate, calcium phosphite, tin oxide, litharge, red lead, white lead, dibasic lead phthalate, dibasic lead carbonate, tin stearate, basic lead phosphite, basic tin phosphite, basic lead sulfite, tribasic lead sulfate, and the like.

From the perspectives of obtaining an innermost layer that is superior with regards to deterioration resistance performance (specifically, resistance to a decline in the mechanical properties of the innermost layer such as breaking elongation over an extended period of time) and achieving superior environmental safety, the acid acceptor is preferably at least one selected from the group consisting of hydrotalcite, magnesium oxide, and calcium hydroxide.

Additionally, from the perspectives of not easily releasing a trapped halogen, obtaining an innermost layer that is superior with regards to deterioration resistance performance (specifically, resistance to a decline in the mechanical properties of the innermost layer such as breaking elongation over an extended period of time), achieving superior environmental safety, and obtaining a polyamide resin composition that is not prone to gelling and easily forms a film, the acid acceptor is preferably a hydrotalcite.

The hydrotalcite used as the acid acceptor is not particularly limited. The hydrotalcite may be a natural or a synthetic hydrotalcite. Specific examples include the following:

$Mg_3ZnAl_2(OH)_{12}CO_3 \cdot wH_2O$ (wherein, w is a positive real number);

$Mg_xAl_y(OH)_{2x+3y-2}CO_3 \cdot wH_2O$ (wherein, x is from 1 to 10, y is from 1 to 10, and w is a positive real number);

$Mg_xAl_y(OH)_{2x+3y-2}CO_3$ (wherein, x is from 1 to 10 and y is from 1 to 10. Specific examples include $Mg_{4.3}Al_2(OH)_{12.6}CO_3$ (Trade name: DHT-4A-2, manufactured by Kyowa Chemical Industry Co., Ltd.); and $Mg_{1-x}Al_xO_{3.83x}$ (0.2≤x<0.5 Specific examples include $Mg_{0.7}Al_{0.3}O_{1.15}$ (Trade name: KW-2200, manufactured by Kyowa Chemical Industry Co., Ltd.).

Chemical equations according to which the hydrotalcite reacts with the acid and traps the halogen (e.g. halogen-containing acid; here, hydrofluoric acid is given as an example) are shown below.

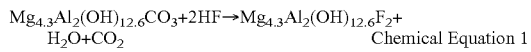

$$Mg_{4.3}Al_2(OH)_{12.6}CO_3 + 2HF \rightarrow Mg_{4.3}Al_2(OH)_{12.6}F_2 + H_2O + CO_2 \quad \text{Chemical Equation 1}$$

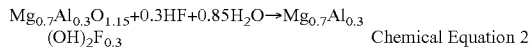

$$Mg_{0.7}Al_{0.3}O_{1.15} + 0.3HF + 0.85H_2O \rightarrow Mg_{0.7}Al_{0.3}(OH)_2F_{0.3} \quad \text{Chemical Equation 2}$$

The halogen trapped by the hydrotalcite and included in a reaction product is not released from the reaction product as long as the reaction product does not decompose as a result of heating at 450° C. or greater.

A maximum usage temperature of hoses for use in car air conditioning systems is approximately 150° C. Therefore, in cases where the hose for refrigerant transport use is used in car air conditioning system applications, there is a benefit in that trapped halogen will not be released. From this perspective as well, a hydrotalcite is preferably used as the acid acceptor.

Among hydrotalcites, from the perspectives of obtaining an innermost layer that is superior with regards to deterioration resistance performance, achieving higher halogen trapping capacity, and not producing water or carbon dioxide after trapping the halogen, hydrotalcites that have low OH contents or $Mg_{1-x}Al_xO_{3.83x}$ are preferable and $Mg_{0.7}Al_{0.3}O_{1.15}$ is more preferable. The hydrotalcite having a low OH content in the chemical structure can be produced by baking a hydrotalcite obtained via synthesis at an elevated temperature.

A commercially available product can be used as the hydrotalcite. Examples of commercially available hydrotalcites include the DHT series (DHT-4A-2, DHT-4C) manufactured by Kyowa Chemical Industry Co., Ltd., the KW series (grade obtained by baking the DHT series at a higher temperatures. It tends to have a higher halogen trapping capacity than the DHT series; KW-2000, KW-2100, and KW-2200) also manufactured by Kyowa Chemical Industry Co., Ltd., and the STABIACE HT series manufactured by Sakai Chemical Industry Co., Ltd.

The acid acceptor may be a natural or synthetic acid acceptor. When the acid acceptor is a synthetic acid acceptor, a manufacturing method thereof may be a conventional method.

From the perspective of achieving increased halogen trapping capacity, the acid acceptor may be one which has not been surface treated by a fatty acid (including higher fatty acids), a fatty acid ester, or the like.

A single acid acceptor can be used or a combination of two or more acid acceptors can be used.

In the present invention, an amount of the acid acceptor is from 0.5 to 20 parts by mass per 100 parts by mass of the polyamide. When within such a range, superior deterioration resistance performance of the innermost layer, superior flexibility (low flexural rigidity of the hose itself and good manageability in an engine room), and superior vibration resistance (vibration from a compressor used to compress the refrigerant does not easily transfer to a vehicle body side and effects of vibration and noise experienced in the vehicle are minimal) are obtained.

Additionally, from the perspectives of obtaining an innermost layer having superior deterioration resistance performance and achieving superior flexibility (flexibility of the innermost layer and the entire hose), the amount of the acid acceptor is preferably from 2 to 15 parts by mass and more preferably from 3 to 15 parts by mass per 100 parts by mass of the polyamide.

A description of the polyamide is given below.

In the present invention, the polyamide comprised in the polyamide resin composition is not particularly limited.

From the perspective of achieving superior refrigerant permeation resistance, the polyamide is preferably at least one selected from the group consisting of polyamide 6, polyamide 11, polyamide 12, polyamide 4-6, polyamide 6-6, polyamide 6-10, polyamide 6-12, and polyamide MXD6.

Even if the polyamide resin composition comprises a polyamide that is prone to hydrolysis (e.g., polyamide 6), the innermost layer of the hose for refrigerant transport use of the present invention can display superior deterioration resistance performance.

A single polyamide can be used or a combination of two or more polyamides can be used.

In the present invention, the polyamide resin composition can further comprise a carboxyl group-containing modified polyolefin. From the perspectives of obtaining an innermost layer that is superior with regards to deterioration resistance performance, and achieving superior flexibility (flexibility of the innermost layer and the entire hose), superior vibration resistance, and superior affinity with the polyamide, the polyamide resin composition preferably further comprises the carboxyl group-containing modified polyolefin.

The carboxyl group-containing modified polyolefin is not particularly limited as long as it is a polyolefin that has a carboxyl group. Additionally, a preferable form of the polyamide comprised in the polyamide resin composition is a modified polyamide obtained by blending the polyamide and the carboxyl group-containing modified polyolefin.

Note that it is sufficient that the innermost layer (gas barrier layer) be formed from the polyamide resin composition (e.g. a preferable form comprises one of the modified polyamides described above), and may comprise other components (e.g. additives and the like) as long as the object of the present invention can be achieved. Cases where such other components are comprised are within the scope of the present invention.

Examples of a preferable carboxyl group-containing modified polyolefin comprises a modified polyolefin wherein from about 0.1 to 10 mol % of a functional group is introduced via graft polymerization of an acid anhydride such as maleic anhydride to a polyolefin which is a homopolymerized or copolymerized olefin such as ethylene, propylene, butadiene, and the like or diene monomer such as butadiene, and the like.

From the perspective of achieving superior flexibility (flexibility of the innermost layer and the entire hose), a weight ratio (polyamide/carboxyl group-containing modified polyolefin, mass ratio) of the polyamide to the carboxyl group-containing modified polyolefin is preferably from 90/10 to 50/50 and more preferably from 85/15 to 65/35. If a proportion of the carboxyl group-containing modified polyolefin is 50 mass % or less, refrigerant permeation resistance will be superior. If the proportion of the carboxyl group-containing modified polyolefin is 10 mass % or greater, flexibility (flexibility of the innermost layer and the entire hose) will be superior.

Examples of the modified polyamide include Zytel ST series products such as Zytel ST801, Zytel ST811, and Zytel ST811HS (manufactured by DuPont), thought to be produced by alloying polyamide 6 and a maleic anhydride modified polyolefin (blended product).

The innermost layer (gas barrier layer) can be formed by extrusion molding the modified polyamide into, for example, a tube shape.

From the perspectives of obtaining an innermost layer that is superior with regards to deterioration resistance performance (specifically, resistance to a decline in the mechanical properties of the innermost layer such as breaking elongation over an extended period of time), achieving superior flexibility (flexibility of the innermost layer and the entire hose), achieving superior environmental safety, not easily releasing a trapped halogen, and obtaining a polyamide resin composition that is not prone to gelling and easily forms a film, the polyamide resin composition preferably comprises the polyamide, the carboxyl group-containing modified polyolefin, and the hydrotalcite.

In the present invention, the polyamide resin composition can further comprises an acid sealing agent.

If the polyamide resin composition further comprises the acid sealing agent, an innermost layer that is superior with regards to deterioration resistance performance can be obtained.

In the present invention, the acid sealing agent can seal or trap (hereinafter referred to as "seal, etc.") acid. The acid sealing agent seals, etc. acid by reacting with an acid.

The acid is not particularly limited as long as it is a compound having at least one acidic group (e.g. carboxy group). Examples thereof include acids such as carboxylic acid, phosphoric acid, and sulfonic acid; and, when the acid as two or more acidic groups, partial esters thereof. The partial ester has at least one acidic group and at least one ester.

Specific examples of the acid include carboxylic acids such as the carboxylic acid present in the innermost layer and the carboxylic acid that is produced via hydrolysis of lubricants such as the ester-based oil present in the refrigerant-containing composition applied to the hose for refrigerant transport use; phosphoric acid that is produced via the hydrolyzing of phosphate ester-based additives included in the lubricant; and sulfonic acid.

Examples of the carboxylic acid present in the innermost layer include carboxylic acids that attach to an end of a polyamide, and carboxylic acids that are produced via a polyamide hydrolyzing as a result of being affected by the deterioration or the like of the refrigerant-containing composition.

Examples of the phosphoric acid include phosphate partial esters with high acidity that are produced via the hydrolyzing of additives such as the triaryl phosphate ester included in the lubricant such as the ester-based oil contained in the refrigerant-containing composition.

The acid sealing agent can suppress the hydrolysis of the polyamide by sealing the carboxylic acid that attaches to the end of the polyamide or by sealing or trapping the carboxylic acid that is produced via the polyamide hydrolyzing as a result of being affected by the deterioration or the like of the refrigerant-containing composition or the acid produced from the refrigerant-containing composition. The present inventors have deduced that the deterioration resistance performance of the innermost layer will be superior due to the suppressing the hydrolysis of the polyamide in such a manner.

In addition to sealing the acid, the acid sealing agent can also trap acidic components produced from the refrigerant-containing composition.

Note that the mechanism described above is a deduction of the present inventors, and, even should the mechanism differ, such a mechanism is within the scope of the present invention.

The acid sealing agent is not particularly limited as long as it is a compound that can seal, etc. acid (including partial esters). Moreover, the acid sealing agent can, for example, trap acid produced from the refrigerant-containing composition.

Examples of the functional group capable of reacting with the acid included in the acid sealing agent include carbodiimide groups, epoxy groups, amino groups, isocyanate groups, and hydroxy groups.

Examples of the acid sealing agent include carbodiimide compounds, epoxy compounds, amine compounds, isocyanate compounds, and alcohols.

Among these, from the perspective of obtaining an innermost layer that is superior with regards to deterioration resistance performance, carbodiimide compounds and epoxy compounds are preferable.

Additionally, from the perspective of achieving superior handling, the acid sealing agent is preferably a solid as room temperature (23° C.).

From the perspective achieving sealability of at least the carboxylic acid included in the polyamide, a preferable form of the acid sealing agent is one by which the carboxylic acid (including partial esters) can at least be sealed, etc.

Note that, in the present invention, the acid sealing agent that seals, etc. at least the carboxylic acid is referred to as a "carboxylic acid sealing agent".

Examples of the carboxylic acid sealing agent include carbodiimide compounds, epoxy compounds, amine compounds, isocyanate compounds, and alcohols.

If the acid sealing agent is the carboxylic acid sealing agent, the carboxylic acid sealing agent can seal, etc. phosphoric acid and sulfonic acid, in addition to the carboxylic acid, and also partial esters thereof.

The following description of the acid sealing agent applies to the carboxylic acid sealing agent.

The carbodiimide compound used as the acid sealing agent is not particularly limited as long as it is a compound having a carbodiimide group ($-N=C=N-$). Examples thereof include polycarbodiimide and monocarbodiimide.

Of these, from the perspective of obtaining an innermost layer that is superior with regards to deterioration resistance performance, polycarbodiimide is preferable.

The polycarbodiimide that can be used in the present invention is not particularly limited as long as it has multiple carbodiimide groups in the molecular chain (e.g. the polymer backbone). The polycarbodiimide can be obtained by, for example, condensing an arbitrary organic diisocyanate, and a conventional technology can be used for the method thereof. For example, a product obtained via a decarboxylation condensation reaction of the organic diisocyanate can be used.

Examples of the polycarbodiimide include urea additives of poly[1,1-dicyclohexylmethane(4,4-diisocyanate)] and cyclohexylamine, and the like.

Preferable forms of commercially available polycarbodiimides include Carbodilite HMV-8CA and Carbodilite LA-1, manufactured by Nisshinbo Holdings Inc., polycarbodiimide compounds that are fine granulates at room temperature, and the like due to their being readily available and usability.

The monocarbodiimide that can be used in the present invention is not particularly limited as long as it has one carbodiimide group. Specific examples include dimethyl carbodiimide, diethyl carbodiimide, diisopropyl carbodiimide, diisobutyl carbodiimide, dioctyl carbodiimide, t-butyl isopropyl carbodiimide, di-t-butyl carbodiimide, dicyclohexyl carbodiimide, diphenyl carbodiimide, 2,2,6,6-tetramethyl diphenyl carbodiimide, 2,2,6,6-tetraethyl diphenyl carbodiimide, 2,2,6,6-tetraisopropyl diphenyl carbodiimide, di-β-naphthyl carbodiimide, and the like.

A description of the epoxy compound is given below.

The epoxy compound used as the acid sealing agent is not particularly limited as long as it is a compound having at least one epoxy group.

Examples of the epoxy compound include polymers containing the epoxy group such as epoxy group-containing (meth)acrylic polymers, epoxy group-containing polystyrenes, and epoxidized soy bean oil; glycidyl esters (including polymers and monomers); and glycidyl ethers (including polymers and monomers).

From the perspectives of obtaining an innermost layer that is superior with regards to deterioration resistance performance and a composition that is not prone to gelling, an epoxy equivalent weight of the epoxy compound is preferably from 140 to 3,300 g/eq.

When the epoxy compound is a polymer containing the epoxy group, from the perspectives of obtaining an innermost layer that is superior with regards to deterioration resistance performance and a composition that is not prone to gelling, the epoxy equivalent weight thereof is preferably from 170 to 3,300 g/eq.

When the epoxy compound is a monomer containing the epoxy group, from the perspectives of obtaining an innermost layer that is superior with regards to deterioration resistance performance and a composition that is not prone to gelling, the epoxy equivalent weight thereof is preferably from 140 to 400 g/eq.

Of these epoxy compounds, from the perspectives of obtaining an innermost layer that is superior with regards to deterioration resistance performance and a composition that is not prone to gelling, epoxy group-containing (meth)acrylic polymers and glycidyl ethers (including polymers and monomers) are preferable.

Additionally, from the perspectives of obtaining an innermost layer that is superior with regards to deterioration resistance performance and a composition that is not prone to gelling, epoxy group-containing (meth)acrylic polymers (especially those that are solid at room temperature) are preferable.

A description of the epoxy group-containing (meth)acrylic polymer is given below.

The epoxy group-containing (meth)acrylic polymer used as the acid sealing agent is not particularly limited as long as the backbone is a (meth)acrylic polymer and is a polymer that has at least one epoxy group.

Note that in the present invention, (meth)acrylic means acrylic and/or methacrylic.

The (meth)acrylic polymer used as the backbone may be either a homopolymer or a copolymer.

An example of the epoxy group-containing (meth)acrylic polymer is a methyl methacrylate.glycidyl methacrylate copolymer.

From the perspectives of obtaining an innermost layer that is superior with regard to deterioration resistance performance and a composition that is not prone to gelling and that has superior handling, a weight average molecular weight of the epoxy group-containing (meth)acrylic polymer is preferably from 5,000 to 300,000 and more preferably from 8,000 to 250,000.

Among these, from the perspectives of obtaining an innermost layer that is superior with regards to deterioration resistance performance, and a composition that is not prone to gelling and that has superior handling, the epoxy group-containing (meth)acrylic polymer is preferably a methyl methacrylate.glycidyl methacrylate copolymer.

A description of the glycidyl ether is given below.

The glycidyl ether used as the acid sealing agent is not particularly limited as long as it is a compound having a glycidyloxy group.

Examples of the glycidyl ether include butyl-glycidyl ether, 2-ethylhexyl glycidyl ether, stearyl-glycidyl ether, allyl-glycidyl ether, phenyl-glycidyl ether, butylphenyl-glycidyl ether, butoxy-polyethyleneglycol-glycidyl ether, glycidol, glycerin.epichlorohydrin-0 to 1 mol additive-polyglycidyl ether, ethylene glycol-epichlorohydrin-0 to 2 mol additive-polyglycidyl ether, polyethyleneglycol-diglycidyl ether, neopentyl glycol-diglycidyl ether, and trimethylolpropane-polyglycidyl ether.

A commercially available product can be used as the epoxy compound.

Examples of commercially available products that can be used as the epoxy group-containing (meth)acrylic polymer include MARPROOF G-0150M (acrylic polymer, powder, weight average molecular weight: 8,000 to 10,000, epoxy equivalent weight: 310 g/eq, manufactured by NOF Corporation) and MARPROOF G-2050M (acrylic polymer, powder, weight average molecular weight: 200,000 to 250,000, epoxy equivalent weight 340 g/eq, manufactured by NOF Corporation).

Examples of commercially available products that can be used as the epoxy group-containing polystyrene include MARPROOF G-1010S (styrene-based polymer, powder, weight average molecular weight: 100,000, epoxy equivalent weight 1,700 g/eq, manufactured by NOF Corporation).

Examples of commercially available products that can be used as the epoxidized soy bean oil include Newsizer 510R (manufactured by NOF Corporation).

A single acid sealing agent can be used or a combination of two or more acid sealing agents can be used.

From the perspectives of obtaining an innermost layer that is superior with regards to deterioration resistance performance and a composition that is not prone to gelling, an amount of the acid sealing agent is preferably from 0.1 to 10 parts by mass and more preferably from 0.5 to 5 parts by mass per 100 parts by mass of the polyamide.

From the perspectives of obtaining an innermost layer that is superior with regards to deterioration resistance performance and a composition that is not prone to gelling, when the acid sealing agent is a carbodiimide composition, the amount thereof is preferably from 0.1 to 2 parts by mass and more preferably from 0.3 to 1 part by mass per 100 parts by mass of the polyamide.

From the perspectives of obtaining an innermost layer that is superior with regards to deterioration resistance performance and a composition that is not prone to gelling, when the acid sealing agent is an epoxy composition, the amount thereof is preferably from 0.1 to 10 parts by mass and more preferably from 0.5 to 5 parts by mass per 100 parts by mass of the polyamide.

From the perspectives of obtaining an innermost layer that is superior with regards to deterioration resistance performance and a composition that is not prone to gelling, a total amount of the acid acceptor and the acid sealing agent is preferably from 3 to 20 parts by mass and more preferably from 5 to 15 parts by mass per 100 parts by mass of the polyamide.

From the perspectives of obtaining an innermost layer that is superior with regards to deterioration resistance performance and a composition that is not prone to gelling, with regards to a weight ratio of the acid sealing agent to the acid receptor, the amount of the acid sealing agent is preferably from 50 to 150 parts by mass and more preferably from 70 to 130 parts by mass per 100 parts by mass of the acid acceptor.

The polyamide resin composition can comprise additives as desired, as long as the object of the present invention is not hindered. Examples of additives include fillers, reinforcing agents, antiaging agents, plasticizers, pigments (dyes), tackifiers, lubricants, dispersing agents, and processing aids.

A manufacturing method of the polyamide resin composition is not particularly limited. Examples thereof include a method wherein the polyamide and the acid acceptor, along with, as required, the acid sealing agent and/or the additives, are mixed using a twin screw kneader extruder.

From the perspective of achieving superior mixing processability, a mixing temperature is preferably from 180 to 300° C. and more preferably from 200 to 280° C.

A Young's modulus of a hardened product (e.g. a sheet) formed from the polyamide resin composition is preferably 300 MPa or less and more preferably 270 MPa or less.

Additionally a Young's modulus of a hardened product (e.g. a sheet) formed from the polyamide resin composition after a test in which the hardened product is immersed in a refrigerant-containing composition including water is preferably 300 MPa or less and more preferably 270 MPa or less. When the Young's modulus of a hardened product after the immersion test described above is 300 MPa or less, superior deterioration resistance performance of the innermost layer, superior flexibility (low flexural rigidity of the hose itself and good manageability in an engine room), and superior vibration resistance (vibration from a compressor used to compress the refrigerant does not easily transfer to a vehicle body side and effects of vibration and noise experienced in the vehicle are minimal) are obtained. If the Young's modulus of the hardened product exceeds 300 MPa, the flexural rigidity of the hose itself will increase, manageability in an engine room will decline, vibration from a compressor will transfer to a vehicle body side, and problems related to vibration and noise will easily occur.

In the present invention, the Young's modulus of the hardened product after the immersion test can be configured to be 300 MPa or less by setting the amount of the acid acceptor to be from 0.5 to 20 parts by mass per 100 parts by mass of the polyamide.

In the present invention, the Young's modulus is measured in accordance with Japan Industry Standard (HS) K 7161 as follows. A sheet is fabricated using the polyamide resin composition at a temperature of 230° C. A sample is cut from the sheet having the following dimensions: 5 mm (width)×80 mm (length)×0.15 mm (thickness) and this sample was used as a sample (sample 1 in the Working Examples). Thereafter, an immersion test is performed by filling an autoclave with a refrigerant-containing composition including water (the refrigerant-containing composition including 50 mass % of HFO-1234yf (manufactured by Honeywell) as a refrigerant and 50 mass % of ATMOS GU-10 (manufactured by Nippon Oil Corporation) as a lubricating oil; wherein 0.1 parts by mass of water per 100 parts by mass of the refrigerant-containing composition are added thereto) and immersing the sample 1 obtained via the process described above therein for 168 hours under the following conditions: heated to 150° C. and pressurized (calculated value=7 MPa). Then the Young's modulus of the obtained samples (sample 1 and sample 2 in the Working Examples) is measured at a tensile speed of 50 mm/minute.

A description of the rubber layer is given below.

In the present invention, the inner tube can have a rubber layer. If the inner tube has a rubber layer, the rubber layer is positioned adjacent to the innermost layer.

A description of the rubber composition used when manufacturing the rubber layer is given below.

In the present invention, the rubber comprised in the rubber composition is not particularly limited. Examples of the rubber include acrylonitrile-butadiene rubber (NBR), natural rubber (NR), butadiene rubber (BR), styrene-butadiene copolymer rubber (SBR), polyisoprene rubber (IR), butyl rubber (IIR), chlorobutyl rubber (Cl-IIR), bromobutyl rubber (Br-IIR), chloroprene rubber, ethylene-propylene copolymer rubber, styrene-isoprene copolymer rubber, styrene-isoprene-butadiene copolymer rubber, isoprene-butadiene copolymer rubber, and chlorosulfonated polyethylene.

From the perspectives of achieving superior fatigue resistance performance and superior permeation resistance, the rubber preferably comprises butyl rubber (IIR).

A single rubber can be used or a combination of two or more rubbers can be used.

In the present invention, the rubber composition can comprise additives as desired, as long as the object of the present invention is not hindered. Examples of additives include vulcanizing agents, vulcanization accelerators, fillers, reinforcing agents, antiaging agents, vulcanization activators, plasticizers, pigments (dyes), tackifiers, lubricants, dispersing agents, and processing aids.

In the present invention, a manufacturing method of the rubber composition is not particularly limited. Examples thereof include a method wherein the rubber and optionally usable additives are mixed (kneaded) using an open roll, a kneader, an extruder, a universal blender, or a batch kneader.

A description of the reinforcing layer is given below.

The hose for refrigerant transport use of the present invention can maintain retention force and obtain superior pressure resistance and clamp crimping fixing force by comprising the reinforcing layer.

Material for the reinforcing layer that can be comprised in the hose for refrigerant transport use of the present invention is not particularly limited.

Examples of the material used from the reinforcing layer includes fiber materials such as polyester-based fiber, polyamide-based fiber, aramid fiber, vinylon fiber, rayon fiber, poly-p-phenylene-benzobisoxazole (PBO) fiber, polyketone fiber, and polyarylate fiber; and metal materials such as hard steel wire (e.g. brass-plated wire, zinc-plated wire, and the like), and the like.

Among these, from the perspectives of obtaining a reinforcing layer having superior fatigue resistance and achieving superior cost performance relative to predetermined desired performance factors, polyester-based fiber is preferable.

A shape of the reinforcing layer is not particularly limited. Examples thereof include braid wind shape and spiral wind shape.

A single reinforcing layer can be used or a combination of two or more reinforcing layers can be used.

A description of the outer layer is given below.

In the hose for refrigerant transport use of the present invention, the reinforcing layer can be protected and superior external moisture invasion resistance can be achieved by comprising the outer layer.

An example of a preferable form of the outer layer that can be comprised in the hose for refrigerant transport use of the present invention is a rubber layer.

Material for the outer layer that can be comprised in the hose for refrigerant transport use of the present invention is not particularly limited. Examples of the material used for the outer layer include other rubber compositions in addition to the same material used in the rubber layer of the present invention.

From the perspective of achieving superior weatherability, ethylene-propylene copolymer rubber is preferably comprised, and from the perspective of achieving superior permeation resistance, butyl rubber (IIR) is preferably comprised.

A method of manufacturing the hose for refrigerant transport use of the present invention is not particularly limited. Examples thereof include subsequently laminating the innermost layer, the rubber layer, the reinforcing layer, and the outer layer on a mandrel and, thereafter, bonding these layers via vulcanizing. Additionally, a bonding treatment between the innermost layer and the rubber layer (e.g. application of an adhesive or surface treatment of the innermost layer) can be performed. A bonding treatment between the rubber layer and the reinforcing layer (e.g. application of an adhesive) can be performed. When the outer layer is a rubber layer that is the same as the rubber layer of the inner tube, a bonding treatment between the reinforcing layer and the outer layer (e.g. application of an adhesive) can be performed.

From the perspective of achieving superior processability, in the present invention, a temperature of the polyamide resin composition when the innermost layer is discharged is preferably from 230 to 250° C.

From the perspective of achieving superior rubber quality and economical efficiency, a temperature when vulcanizing is preferably from 130 to 180° C.

From the perspective of achieving superior rubber quality and economical efficiency, a vulcanizing time is preferably from 30 to 120 minutes.

Examples of vulcanization methods include press vulcanization, steam vulcanization, oven vulcanization (dry heat vulcanization), and hot water vulcanization.

The refrigerant-containing composition that can be used in the hose for refrigerant transport use of the present invention is not particularly limited. Examples thereof include compositions comprising a refrigerant such as fluorine-based compounds and a lubricant.

Examples of the refrigerant comprised in the refrigerant-containing composition include fluorine-based compounds having double bond; and saturated hydrofluorocarbons such as HFC-134a (structural formula: $CF_3$—$CFH_2$).

Examples of the fluorine-based compounds having a double bond include fluoropropenes such as 1,2,3,3,3-pentafluoropropene, 1,3,3,3-tetrafluoropropene, 2,3,3,3-tetrafluoropropene (structural formula: $CF_3$—$CF$=$CH_2$, HFO-1234yf), 1,2,3,3-tetrafluoropropene, and 3,3,3-trifluoropropene.

The innermost layer comprised in the hose for refrigerant transport use of the present invention has superior deterioration resistance performance with respect to fluorine-based compounds having a double bond such as fluoropropenes (particularly, new refrigerants such as HFO-1234yf). Additionally, by enhancing the deterioration resistance performance of the innermost layer, the innermost layer becomes resistant to cracking due to deformation and/or vibrating of the hose for refrigerant transport use, which leads to an improvement in the dynamic fatigue properties of the innermost layer.

The lubricating oil comprised in the refrigerant-containing composition is not particularly limited. Examples thereof include conventionally known products.

The hose for refrigerant transport use of the present invention can be used to transport a refrigerant, and, for example, can be used as a hose for transporting fluids such as a hose for use in air conditioning systems (e.g. car air conditioning systems). Additionally, the hose for refrigerant transport use of the present invention can be used, for example, as a hose for transporting hot water (temperature regulator use) in addition to being usable as a hose for use in air conditioning systems.

Working Examples

The present invention is described below in detail using working examples but the present invention is not limited to such working examples.

Evaluation

Samples obtained according to the process described below were subjected to immersion testing and tensile test via the following methods. The tensile strength ($T_B$), elongation ($E_B$), and condition of the sample after immersion testing were evaluated. The results are shown in the table in FIGS. 2a-2b.

1. Fabrication of Sample 1

A sheet was fabricated from a polyamide resin composition obtained via the process described below using an electric heating press at a temperature of 230° C. A sample was cut from the sheet having the following dimensions: 5 mm (width)×80 mm (length)×0.15 mm (thickness) and this sample was used as sample 1.

2. Immersion Test (Accelerated Deterioration Test)

The immersion test was performed by filling an autoclave with a refrigerant-containing composition including water (the refrigerant-containing composition including 50 mass % of HFO-1234yf (manufactured by Honeywell) as a refrigerant and 50 mass % of ATMOS GU-10 (manufactured by Nippon Oil Corporation) as a lubricating oil; wherein 0.1 parts by mass of water per 100 parts by mass of the refrigerant-containing composition are added thereto) and immersing the sample 1 obtained according to the process described above therein for 168 hours under the following conditions: heated to 150° C. and pressurized (calculated value=7 MPa).

Following the immersion test, the sample 1 was removed from the refrigerant-containing composition including water. The post-immersion test sample is referred to as sample 2.

3. Tensile Test

The tensile strength ($T_B$) and elongation ($E_B$) at 23° C. of the sample 1 and sample 2 that were obtained via the processes described above were measured in accordance with Japan Industry Standard (JIS) K 7161. Tensile speed was set at 50 mm/minute.

4. Evaluation of the Conditions of the Sample Before and after the Immersion Test The sample 1 and sample 2 that were obtained via the processes described above were bent and the conditions of the sample before and after the immersion test were evaluated.

5. Young's Modulus (Tensile Modulus of Elasticity)

The Young's modulus of the sample 2 that was obtained via the processes described above was measured in accordance with JIS K 7161 at a tensile speed of 50 mm/minute.

Manufacture of the Polyamide Resin Composition

The polyamide resin composition was manufactured by uniformly mixing the components shown in the table in FIGS. 2a-2b at the amounts (parts by mass) also shown in the table using a twin screw kneader extruder.

The components shown in the table are as follows.

Polyamide (1): A blend of polyamide 6 and a carboxyl group-containing modified polyolefin (Zytel ST811HS, manufactured by DuPont)

Polyamide (2): Polyamide 11 (RILSAN BESNO TL, manufactured by Arkema Inc.)

Acid acceptor 1: Calcium hydroxide (lime hydrate), manufactured by Irimajiri Sekkai Industry, Co., Ltd.

Acid acceptor 2: Magnesium oxide (Kyowa Mag 150, manufactured by Kyowa Chemical Industrial Co., Ltd.)

Acid acceptor 3: Hydrotalcite (KW-2200, manufactured by Kyowa Chemical Industrial Co., Ltd.)

Acid acceptor 4: Hydrotalcite (DHT-4A-2, manufactured by Kyowa Chemical Industrial Co., Ltd.)

Acid sealing agent 1: Methyl methacrylate.glycidyl methacrylate copolymer (MARPROOF G-2050M, weight average molecular weight: 200,000 to 250,000; epoxy equivalent weight: 340 g/eq; manufactured by NOF Corporation)

It is clear from the results shown in the table in FIGS. 2a-2b that the sample of Comparative Example 1, which did not comprise an acid acceptor, was brittle after the immersion test and had an innermost layer with inferior deterioration resistance performance. The sample of Comparative Example 2 wherein the amount of the acid acceptor was less than 0.5 parts by mass per 100 parts by mass of the polyamide cracked when bent after the immersion test and had an innermost layer with inferior deterioration resistance performance. With the sample of Comparative Example 3 wherein the amount of the acid acceptor exceeded 20 parts by mass per 100 parts by mass of the polyamide, the hardness of the cured product of the polyamide resin composition after the immersion test was excessive and the deterioration resistance performance of the innermost layer was inferior.

In contrast, with the samples of Working Examples 1 to 11, declines in the tensile strength ($T_B$) and elongation ($E_B$) of the samples were suppressed, no cracking occurred when bending after the immersion tests, and innermost layers of hoses for refrigerant transport use having superior deterioration resistance performance were obtained. Note that the suppression of the declines in the tensile strength ($T_B$) and elongation ($E_B$) of the samples and lack of cracking when bending after the immersion tests are indicators that the samples (innermost layers) of Working Examples 1 to 11 achieved superior deterioration resistance performance.

Additionally, with the samples of Working Examples 1 to 11, superior flexibility (flexibility of the innermost layer and of the entire hose) was achieved due to the post-immersion test Young's modulus being within a suitable range and the samples not becoming excessively hard.

Additionally, with the sample of Working Example 8 that comprised an acid acceptor (hydrotalcite) with a lower OH content than that of Working Example 10, the declines in the tensile strength ($T_B$) and elongation ($E_B$) of the sample were further suppressed. Thus, it is clear that using a hydrotalcite having a lower OH content or $Mg_{1-x}Al_xO_{3.83x}$ as the acid acceptor leads to obtaining an innermost layer that is superior with regards to deterioration resistance performance.

Working Example 12

Manufacture of Hose 1

A hose was manufactured by extruding an innermost layer having a thickness of 0.15 mm using the polyamide resin composition of Working Example 1 with a resin extruder on a surface of a mandrel made from thermoplastic resin having an outer diameter of 11 mm (extrusion temperature: 240° C.). A tube rubber layer (hereinafter "butyl rubber composition A") having a thickness of 1.2 mm was extruded on a surface of the innermost layer, and a two-layer reinforcing layer made by alternately winding polyethylene terephthalate (PET) fiber having a gross thread thickness of 80,000 dtex in a spiral wind shape was formed. A cover rubber layer (having the same composition as the butyl rubber composition A) having a thickness of 1.0 mm was extruded on a surface of the reinforcing layer and formed into an extruded outer layer. Furthermore, a conventional polymethylpentene resin was extruded on the extruded outer layer and formed into a cover skin. The obtained tube shaped laminate was vulcanized for 100 minutes at 160° C. and, thereafter, the cover skin and the mandrel were removed from the tube shaped laminate.

The hose for refrigerant transport use of Working Example 12 comprises the innermost layer of Working Example 1, which, as described above, has superior deterioration resistance performance.

Butyl rubber composition A (same composition for tube rubber and cover rubber): Composition consisting of 100 parts by mass of butyl rubber, 80 parts by mass of carbon black (HAF), 3 parts by mass of stearic acid, 10 parts by mass of paraffin oil, 2 parts by mass of zinc oxide, and 8 parts by mass of brominated alkyl phenol formaldehyde resin.

Working Example 13

Manufacture of Hose 2

A hose 2 was manufactured in the same manner as the hose 1 of Working Example 12, with the exception that the polyamide resin composition of Working Example 1 was replaced by the polyamide resin composition of Working Example 7.

The hose for refrigerant transport use of Working Example 13 comprises the innermost layer of Working Example 1, which, as described above, has superior deterioration resistance performance.

What is claimed is:

1. A hose for refrigerant transport use comprising:
   an innermost layer formed using a polyamide resin composition comprising a polyamide and, per 100 parts by mass thereof,
   from 0.5 to 20 parts by mass of an acid acceptor; wherein
   the hose for refrigerant transport use is used for a refrigerant-containing composition comprising a fluorine-based compound having a double bond as a refrigerant.

2. The hose for refrigerant transport use according to claim 1, wherein the acid acceptor is at least one selected from the group consisting of a metal compound, an inorganic microporous crystal, and a hydrotalcite.

3. The hose for refrigerant transport use according to claim 2, wherein the metal compound is at least one selected from the group consisting of:
   oxides, hydroxides, carbonates, carboxylates, silicates, borates, and phosphites of the periodic table group 2 and group 12 metals;
   oxides, hydroxides, carboxylates, silicates, sulfates, nitrates, and phosphates of the periodic table group 3 and group 13 metals; and
   oxides, basic carbonates, basic carboxylates, basic phosphites, basic sulfites, and tribasic sulfates of the periodic table group 4 and group 14 metals.

4. The hose for refrigerant transport use according to claim 2, wherein the metal compound is at least one selected from the group consisting of: magnesium oxide, calcium hydroxide, magnesium hydroxide, aluminum hydroxide, barium hydroxide, sodium carbonate, magnesium carbonate, barium carbonate, calcium oxide, calcium carbonate, calcium silicate, calcium stearate, zinc stearate, zinc oxide, calcium phthalate, calcium phosphite, tin oxide, litharge, red lead, dibasic lead phthalate, dibasic lead carbonate, tin stearate, basic lead phosphite, basic tin phosphite, basic lead sulfite, and tribasic lead sulfate.

5. The hose for refrigerant transport use according to claim 1, wherein the polyamide resin composition further comprises a carboxyl group-containing modified polyolefin.

6. The hose for refrigerant transport use according to claim 1, wherein the polyamide is at least one selected from the group consisting of polyamide 6, polyamide 11, polyamide 12, polyamide 4-6, polyamide 6-6, polyamide 6-10, polyamide 6-12, and polyamide MXD6.

7. The hose for refrigerant transport use according to claim 1, wherein the fluorine-based compound is at least one fluoropropene selected from the group consisting of 1,2,3,3,3-pentafluoropropene, 1,3,3,3-tetrafluoropropene, 2,3,3,3-tetrafluoropropene, 1,2,3,3-tetrafluoropropene, and 3,3,3-trifluoropropene.

8. The hose for refrigerant transport use according to claim 1, wherein the polyamide resin composition further comprises an acid sealing agent.

9. The hose for refrigerant transport use according to claim 8, wherein the acid sealing agent is at least one selected from the group consisting of a carbodiimide compound, an epoxy compound, an amine compound, an isocyanate compound, and an alcohol.

10. The hose for refrigerant transport use according to claim 9, wherein an epoxy equivalent weight of the epoxy compound is from 140 to 3,300 g/eq.

11. The hose for refrigerant transport use according to claim 8, wherein an amount of the acid sealing agent is from 0.1 to 10 parts by mass per 100 parts by mass of the polyamide.

12. The hose for refrigerant transport use according to claim 1 comprising a rubber layer on the innermost layer, a reinforcing layer on the rubber layer, and an outer layer on the reinforcing layer.

13. The hose for refrigerant transport use according to claim 1, wherein a Young's modulus of a hardened product formed from the polyamide resin composition, after a test in which the hardened product is immersed in the refrigerant-containing composition further comprising water, is 300 MPa or less.

14. The hose for refrigerant transport use according to claim 5, wherein a weight ratio (mass ratio) of the polyamide to the carboxyl group-containing modified polyolefin is from 90/10 to 50/50.

15. The hose for transporting refrigerant according to claim 1, wherein the acid acceptor is a hydrotalcite.

16. The hose for refrigerant transport use according to claim 1, wherein the acid acceptor is represented by the chemical formula: $Mg_{1-x}Al_xO_{3.83x}$ ($0.2 \leq x < 0.5$).

* * * * *